United States Patent
Okabe et al.

(10) Patent No.: US 12,504,316 B2
(45) Date of Patent: *Dec. 23, 2025

(54) METHOD FOR CONFIRMING WEIGHING PERFORMANCE OF BALANCE, AND BALANCE FOR THE SAME

(71) Applicant: A&D COMPANY, LIMITED, Tokyo (JP)

(72) Inventors: Kazuna Okabe, Saitama (JP); Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 18/269,520

(22) PCT Filed: Dec. 7, 2021

(86) PCT No.: PCT/JP2021/044824
§ 371 (c)(1),
(2) Date: Jun. 23, 2023

(87) PCT Pub. No.: WO2022/138124
PCT Pub. Date: Jun. 30, 2022

(65) Prior Publication Data
US 2024/0094048 A1    Mar. 21, 2024

(30) Foreign Application Priority Data
Dec. 25, 2020   (JP) .................................. 2020-216198

(51) Int. Cl.
*G01G 23/01*   (2006.01)
*G01G 21/22*   (2006.01)
(Continued)

(52) U.S. Cl.
CPC ............. *G01G 23/01* (2013.01); *G01G 21/22* (2013.01); *G01G 21/286* (2013.01); *G01G 23/18* (2013.01)

(58) Field of Classification Search
USPC .................................................. 177/1
See application file for complete search history.

(56) References Cited

U.S. PATENT DOCUMENTS 4,660,263 A * 4/1987 Kosteck .................... B24C 1/06
451/40
4,932,487 A   6/1990 Melcher et al.
(Continued)

FOREIGN PATENT DOCUMENTS

| JP | S62-280624 A | 12/1987 |
| JP | H07-023239 U | 4/1995 |

(Continued)

*Primary Examiner* — Jacques M Saint Surin
(74) *Attorney, Agent, or Firm* — Studebaker Brackett PLLC

(57) ABSTRACT

In order to achieve the object described above, an electronic balance includes a weighing pan, a windshield, door opening and closing mechanisms configured to automatically open and close doors of the windshield, a weight sensor, a built-in weight, a weight applying and removing mechanism for the built-in weight, and a control unit, the control unit measures a standard deviation of the built-in weight as an actual use standard deviation (SDreal) accompanied by a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the door opening and closing mechanism.

12 Claims, 11 Drawing Sheets

(51) Int. Cl.
*G01G 21/28* (2006.01)
*G01G 23/18* (2006.01)

(56) References Cited

U.S. PATENT DOCUMENTS

| | | | |
|---|---|---|---|
| 5,056,050 | A | 10/1991 | Fuchs et al. |
| 6,194,670 | B1* | 2/2001 | Reichmuth ........ G01G 23/3707 |
| | | | 73/1.13 |
| 7,652,215 | B2* | 1/2010 | Hamamoto ............ G01G 23/37 |
| | | | 177/180 |
| 7,705,249 | B2* | 4/2010 | Rindermann ...... G01G 23/3707 |
| | | | 700/84 |
| 8,203,086 | B2 | 6/2012 | Izumo et al. |
| 10,401,211 | B2* | 9/2019 | Nagane .................... G01G 7/04 |
| 11,231,446 | B2* | 1/2022 | Uebel ................. H04L 12/2825 |
| 11,473,966 | B2* | 10/2022 | Oda ........................ E05F 15/56 |
| 2009/0020341 | A1 | 1/2009 | Hamamoto et al. |
| 2013/0068542 | A1 | 3/2013 | Izumo et al. |
| 2015/0204716 | A1* | 7/2015 | Lewandowski ......... E05F 15/73 |
| | | | 177/180 |
| 2016/0250628 | A1 | 9/2016 | Graf et al. |
| 2021/0156731 | A1 | 5/2021 | Oda |
| 2024/0060816 | A1* | 2/2024 | Okabe .................... G01G 23/01 |
| 2024/0094049 | A1* | 3/2024 | Oda ....................... G01G 13/02 |

FOREIGN PATENT DOCUMENTS

| | | |
|---|---|---|
| JP | 2001-133317 A | 5/2001 |
| JP | 2007-212254 A | 8/2007 |
| JP | 2012-002677 A | 1/2012 |
| JP | 2012-007970 A | 1/2012 |
| JP | 4851882 B2 | 1/2012 |
| JP | 5062880 B2 | 10/2012 |
| WO | 2006/082915 A1 | 8/2006 |
| WO | 2020/129190 A1 | 6/2020 |

* cited by examiner

```
---- TEST ----

A & D
MODEL      BA-6T

S/N    T2103421

ID 0000000000000

DATE   2020/09/02

TIME    19:39:41

INTERNAL WEIGHT

SDspec
   S.D.    0.0010 mg

SDreal
   S.D.    0.0020 mg

JUDGMENT
   PERFORMANCE   A
REMARKS

SIGNATURE

METHOD FOR CONFIRMING WEIGHING PERFORMANCE OF BALANCE, AND BALANCE FOR THE SAME

TECHNICAL FIELD

The present invention relates to a method for confirming the weighing performance of an electronic balance, and an electronic balance for the same.

BACKGROUND ART

In order for an electronic balance to perform weighing with high accuracy, it is important to know the degree of variation (repeatability) of weighed values for confirmation of the weighing performance. Therefore, an electronic balance with high accuracy incorporates a weight whose mass is known (hereinafter, referred to as a built-in weight) and has an automatic calibration function to measure a standard deviation of the built-in weight by automatically applying and removing the built-in weight to and from a weight sensor periodically or at the time of a user's operation (for example, Patent Literature 1). Further, in many cases, an electronic balance with high accuracy is provided with a windshield (for example, Patent Literature 2). This is because air flow around the weighing pan, which is one of the factors that lowers weighing accuracy, can be prevented by covering a weighing pan with the windshield.

CITATION LIST

Patent Literatures

[Patent Literature 1] Japanese Patent No. 4851882
[Patent Literature 2] Japanese Patent No. 5062880

SUMMARY OF INVENTION

Technical Problem

In a case of an electronic balance with a windshield, the confirmation of repeatability described above, that is, built-in weight applying and removing operations for obtaining a standard deviation of the built-in weight are performed in a state where the windshield is closed. However, at the time of actual weighing, a user performs weighing in a serial flow in which the user opens a door of the windshield and loads a to-be-weighed object, closes the door and measures weighing data of the to-be-weighed object, and opens the door and unloads the to-be-weighed object. Therefore, a standard deviation measured in the state where the windshield is closed is obtained under conditions different from those of weighing that the user performs in actuality, so that at the time of actual weighing, to what extent the repeatability (weighing performance) is exhibited cannot be known, which has been a problem.

The present invention was made to solve the problem described above, and an object thereof is to provide a method for confirming the weighing performance under conditions close to actual use by a user, and an electronic balance for the same.

Solution to Problem

In order to solve the problem described above, an electronic balance according to an aspect of the present invention includes a weighing pan on which a to-be-weighed object is placed, a windshield surrounding the weighing pan, a door opening and closing mechanism configured to automatically open and close a door of the windshield, a weight sensor to which a load applied to the weighing pan is transmitted, a built-in weight to be loaded on and unloaded from the weight sensor, a weight applying and removing mechanism for the built-in weight, and a control unit configured to control the door opening and closing mechanism and the weight applying and removing mechanism, wherein the control unit measures a standard deviation of the built-in weight as an actual use standard deviation accompanied by a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the door opening and closing mechanism.

In the aspect described above, it is also preferable that when the actual use standard deviation is worse than a reference, the control unit notifies a user that the weighing performance of the balance has been lowered by opening and closing of the door.

In the aspect described above, it is also preferable that the control unit ranks a difference value between the actual use standard deviation and a specification standard deviation, or a square root value of a difference between the square of the actual use standard deviation and the square of the specification standard deviation according to an evaluation threshold set in consideration of an internal design of the electronic balance, so as to evaluate the weighing performance of the balance.

In the aspect described above, it is also preferable that when the actual use standard deviation is worse than a reference, the control unit measures an opening time during which the door is open when weighing the to-be-weighed object, and issues a warning when a default setting opening time passes.

In the aspect described above, it is also preferable that when the actual use standard deviation is worse than a reference, the control unit controls the door opening and closing mechanism to make smaller an opening width of the door when weighing the to-be-weighed object than a default setting opening width.

In the aspect described above, it is also preferable that when the actual use standard deviation is worse than a reference, the control unit controls the door opening and closing mechanism to make higher an opening and closing speed of the door when weighing the to-be-weighed object than a default setting opening and closing speed.

In the aspect described above, it is also preferable that when the actual use standard deviation is worse than a reference, the control unit controls the door opening and closing mechanism to make longer an acquisition time of weighing data of the to-be-weighed object when weighing the to-be-weighed object than a default setting acquisition time.

In the aspect described above, it is also preferable that the control unit ranks the actual use standard deviation, and the lower the rank, the more the control unit performs the above-described control in combination.

In order to solve the problem described above, a method for confirming the weighing performance of an electronic balance according to an aspect of the present invention is a method for confirming the weighing performance of an electronic balance including a weighing pan on which a to-be-weighed object is placed, a windshield surrounding the weighing pan, a door opening and closing mechanism configured to automatically open and close a door of the windshield, a weight sensor to which a load applied to the weighing pan is transmitted, a built-in weight to be loaded on and unloaded from the weight sensor, a weight applying and removing mechanism for the built-in weight, and a control unit configured to control the door opening and closing mechanism and the weight applying and removing mechanism, and includes a step of measuring a standard deviation of the built-in weight as an actual use standard deviation by repeating in order a step of opening the door of the windshield by the door opening and closing mechanism, a step of loading the built-in weight by the weight applying and removing mechanism, a step of closing the door of the windshield by the door opening and closing mechanism, a step of acquiring weighing data of the built-in weight, a step of opening the door of the windshield by the door opening and closing mechanism, a step of unloading the built-in weight by the weight applying and removing mechanism, and a step of closing the door of the windshield by the door opening and closing mechanism.

Advantageous Effects of Invention

According to the present invention, the weighing performance of an electronic balance can be confirmed under conditions close to actual use by a user.

BRIEF DESCRIPTION OF DRAWINGS

FIG. 7 illustrates an output example of an evaluation result in the same flow.

DESCRIPTION OF EMBODIMENTS

Next, preferred embodiments of the present invention will be described based on the drawings.

(Configuration of Electronic Balance)

Figure 1:
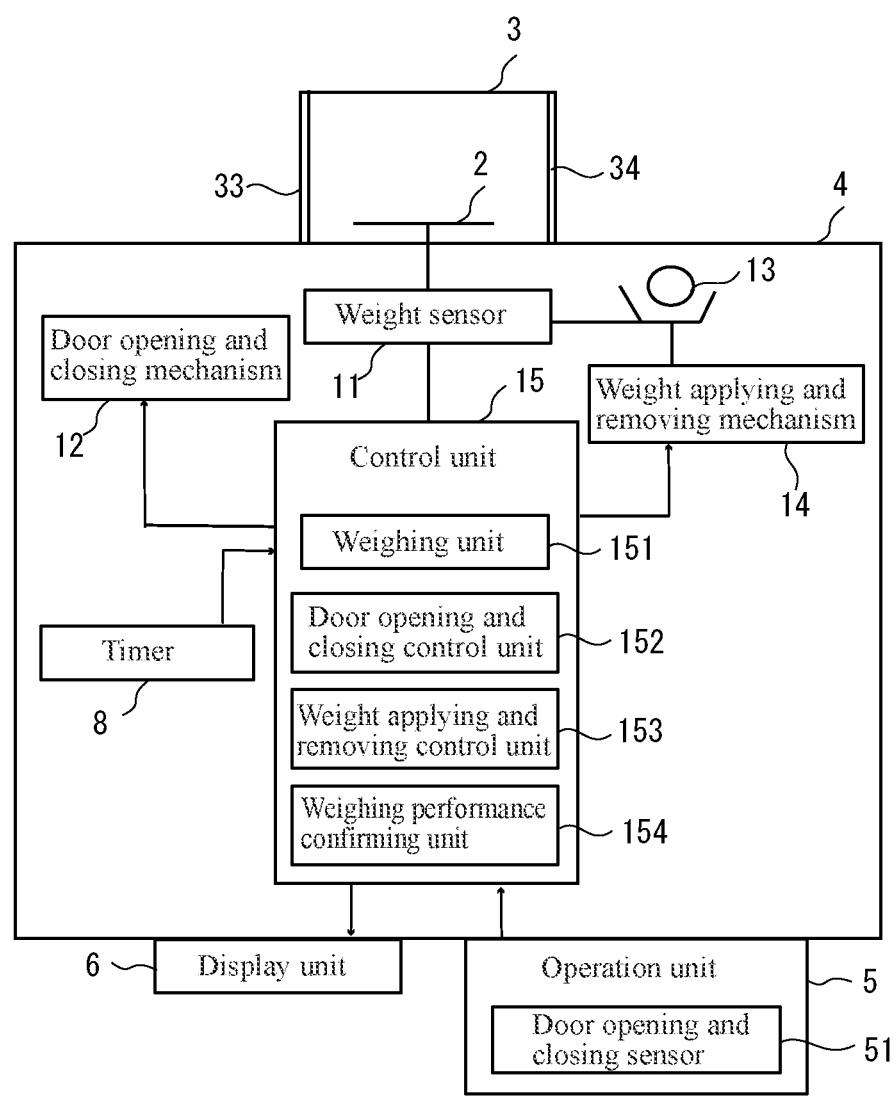
FIG. 1 is a component block diagram of an electronic balance according to an embodiment of the present invention.
Figure 2:
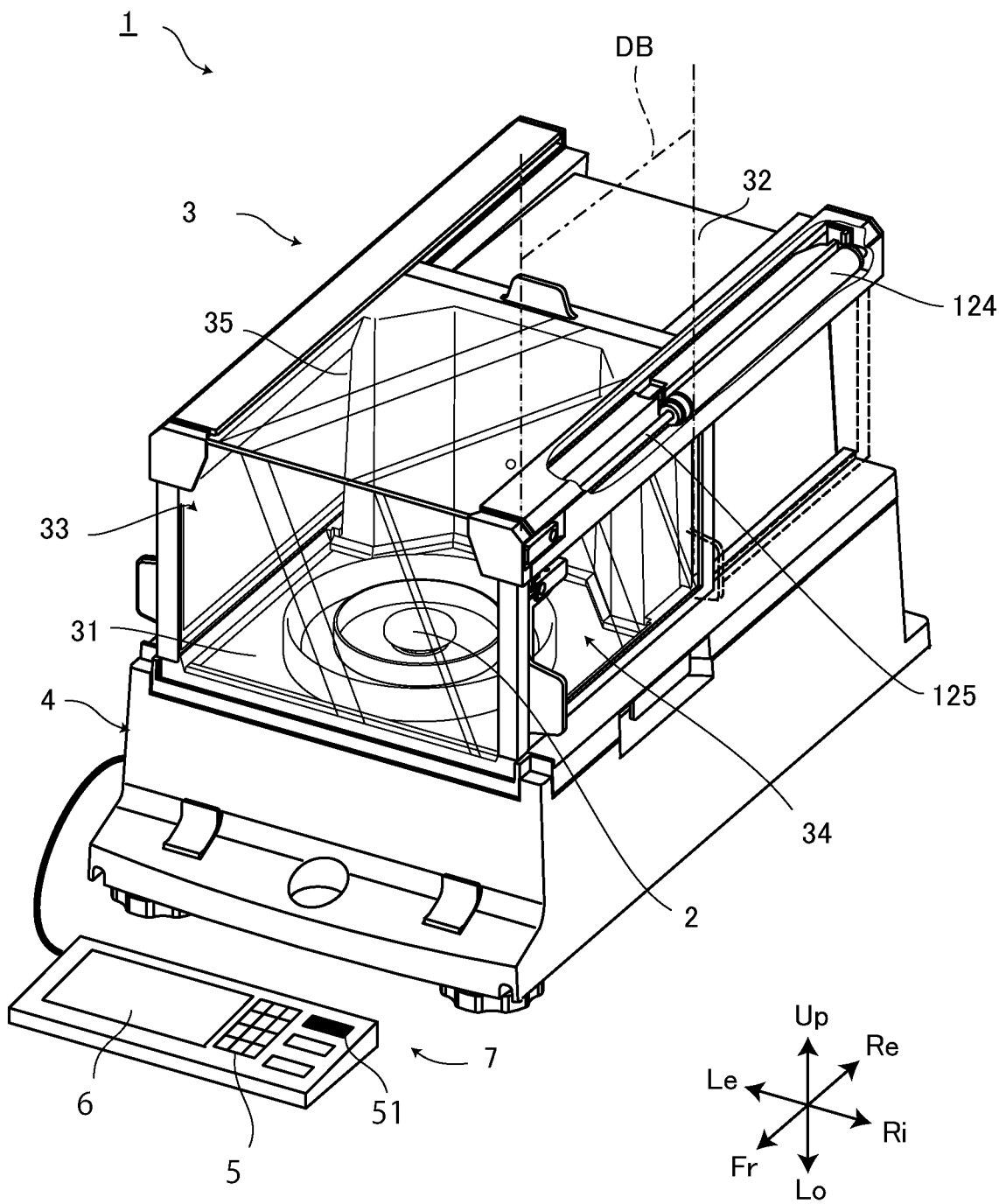
FIG. 2 illustrates an example of an apparatus configuration of the same electronic balance.

FIG. 1 is a component block diagram of an electronic balance according to an embodiment of the present invention. FIG. 2 illustrates an example of an apparatus configuration of the electronic balance illustrated in FIG. 1, and is a right-side perspective view of the same configuration example. As illustrated in FIG. 1, an electronic balance 1 (hereinafter, simply referred to as a balance 1) includes a weighing pan 2, a windshield 3, a balance main body 4, an operation unit 5, a display unit 6, a timer 8, a weight sensor 11, a door opening and closing mechanism 12, a built-in weight 13, a weight applying and removing mechanism 14, and a control unit 15. FIG. 2 illustrates a configuration example embodying the balance 1, and hereinafter, the components mentioned above will be described with reference to FIG. 2.

The balance main body 4 is a case in which the weight sensor 11, the door opening and closing mechanism 12, the built-in weight 13, the weight applying and removing mechanism 14, the control unit 15, and the timer 8 are included, and the weighing pan 2 is disposed at a center of an upper portion of the balance main body 4.

The operation unit 5 and the display unit 6 are provided on a control panel 7, and the control panel 7 is connected to the balance main body 4 by a cable. The operation unit 5 includes key switches necessary for operating the balance 1, and on a screen of the display unit 6, a menu and results relating to weighing, and further, a menu and results relating to weighing performance confirmation to be described later, are displayed. However, the control panel 7 and the balance main body 4 may be connected wirelessly. The operation unit 5 and the display unit 6 may be provided on the balance main body 4. It is also preferable that the operation unit 5 includes a door opening and closing sensor (or button) 51 that triggers automatic opening and closing of the door opening and closing mechanism 12 to be described later.

The windshield 3 has a bottomless box shape, and is detachably attached to the balance main body 4. For an attaching and detaching mechanism, a conventionally known configuration, for example, the configuration disclosed in Japanese Patent No. 5062880, etc., disclosed as a patent literature may be used. However, a configuration for which the windshield 3 and the balance main body 4 are integrated in a non-separable manner is also possible. The windshield 3 includes a front plate 31 at a front side, a back case 32 at a rear side, and opening and closing doors on left and right sides (hereinafter, the door on the left side is referred to as a left door 33, and the door on the right side is referred to as a right door 34), and an opening and closing door at an upper side (hereinafter, referred to as an upper door 35). The front plate 31, the back case 32, the left door 33, the right door 34, and the upper door 35 define a weighing chamber surrounding the weighing pan 2 in all directions. Note that the expressions containing front, rear, left, upper/up, and lower/down used in the present description refer to directions indicated by the arrows Fr-Re (Front-Rear), Le-Ri (Left-Right), Up-Lo (Up-Down) illustrated in FIG. 2, respectively.

The front plate 31, the left door 33, the right door 34, and the upper door 35 are made of a transparent glass or resin so that an internal state can be observed. The back case 32 is made of, for example, glass, metal, or plastic. Each of the upper door 35, the left door 33, and the right door 34 is provided with a handle that assists door sliding. The upper door 35 can be manually opened and closed in the front-rear direction, and the left door 33 and the right door 34 can be automatically opened and closed in the front-rear direction by the door opening and closing mechanism 12 to be described later.

As the weight sensor 11, an electromagnetic balance type, a strain gauge type, or a capacitive type is used. To the weight sensor 11, a load of a to-be-weighed object placed on the weighing pan 2 is transmitted through a load transmitting mechanism (not illustrated) such as a beam. A load detected by the weight sensor 11 is output as weighing data to the control unit 15. To the weight sensor 11, the built-in weight 13 is also applied, and weighing data of the built-in weight 13 is also output to the control unit 15.

The timer 8 acquires a current time (system time) of the balance 1 by calculating count values of a hardware timer and a software timer. The timer 8 may be a built-in clock of the control unit 15.

The control unit 15 is, for example, a microcontroller configured by mounting a CPU and a memory, etc., on an integrated circuit. The control unit 15 includes a weighing unit 151 that calculates a weighed value from weighing data detected by the weight sensor 11, a door opening and closing control unit 152 that controls the door opening and closing mechanism 12, a weight applying and removing control unit 153 that controls the weight applying and removing mechanism 14, and a weighing performance confirming unit 154. These functional units 151 to 154 are configured by electronic circuits such as a CPU (Central Processing Unit), an ASIC (Application Specific Integrated Circuit), and an PLD (Programmable Logic Device) such as FPGA (Field Programmable Gate Array).

The weighing unit 151 acquires weighing data of a to-be-weighed object by converting an analog signal detected by the weight sensor 11 into a digital signal. When a to-be-weighed object is placed on the weighing pan 2, the weighing unit 151 waits for a predetermined period of time (hereinafter, referred to as an "acquisition time." The acquisition time is set in advance, and stored in the memory of the control unit 15) in which weighing data of the to-be-weighed object is expected to be stabilized, and calculates a weighed value by subtracting weighing data obtained in a state where the to-be-weighed object is not on the weighing pan 2 from the weighing data. Details of the functions of the door opening and closing control unit 152, the weight applying and removing control unit 153, and the weighing performance confirming unit 154 will be described later.

The built-in weight 13 is a weight whose weight is known disposed in the balance main body 4 for calibration of the balance. The known weight of the built-in weight 13 is stored in advance in the memory of the control unit 15.

Figure 3:
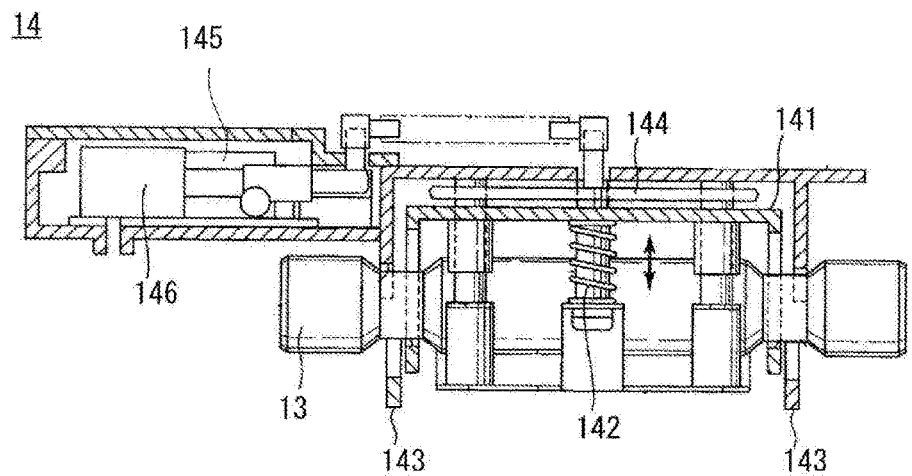
FIG. 3 illustrates a configuration example of a weight applying and removing mechanism in the same electronic balance.

The built-in weight 13 is loaded on and unloaded from the weight sensor 11 by the weight applying and removing mechanism 14. FIG. 3 illustrates a configuration example of the weight applying and removing mechanism 14, and is a longitudinal sectional view of the same configuration example. The weight applying and removing mechanism 14 includes the built-in weight 13, a weight holder 141, a spring 142, a load receiving portion 143, an air bag 144, a bag pressurization pump 145, and a bag one-way solenoid valve 146. The built-in weight 13 is held by the weight holder 141, and the weight holder 141 is biased upward by the spring 142. The air bag 144 is disposed at a position where the air bag pushes down the weight holder 141 downward, and the bag pressurization pump 145 and the bag one-way solenoid valve 146 are connected to the air bag 144. The load receiving portion 143 is connected to the weight sensor 11 via a load transmitting mechanism (not illustrated) different from the weighing pan 2.

The weight applying and removing mechanism 14 is controlled by the weight applying and removing control unit 153 of the control unit 15. When loading the built-in weight 13 on the weight sensor 11, the weight applying and removing control unit 153 activates the bag pressurization pump 145 to inflate the air bag 144, push down the weight holder 141 against the biasing force of the spring 142, apply a load of the built-in weight 13 to the load receiving portion 143, and transmit the full load of the built-in weight 13 to the weight sensor 11. On the other hand, when unloading the built-in weight 13 from the weight sensor 11, the weight applying and removing control unit 153 opens the bag one-way solenoid valve 146 to the atmosphere to deflate the air bag 144, pushup the weight holder 141 by the biasing force of the spring 142, and remove the load of the built-in weight from the load receiving portion 143.

Figure 4:
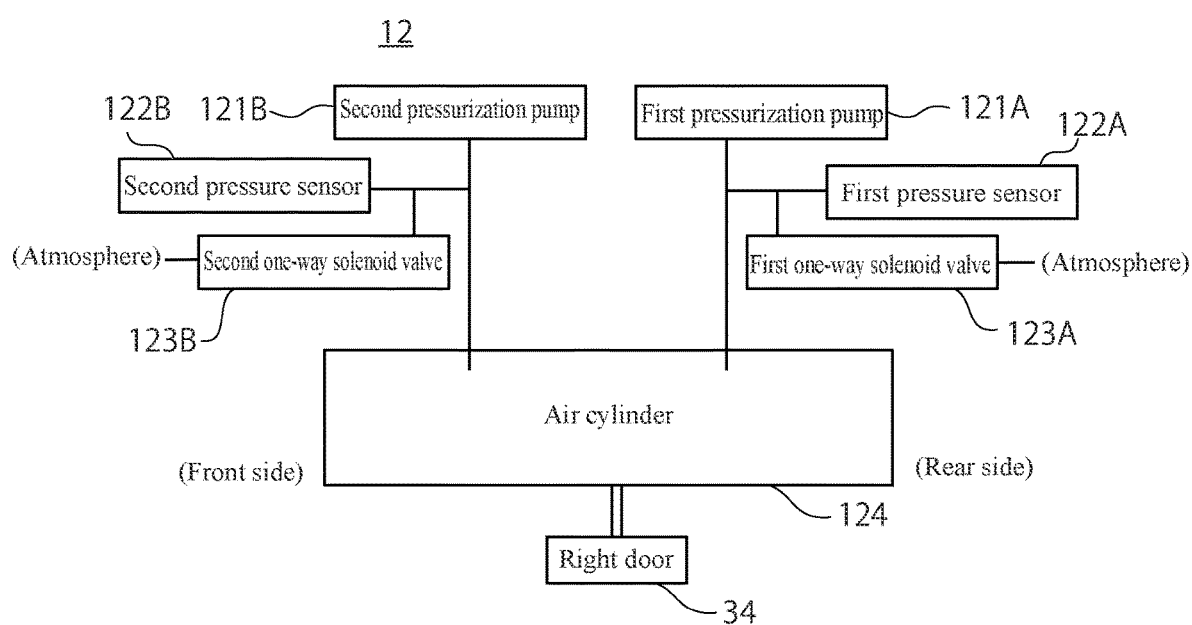
FIG. 4 illustrates a configuration example of a door opening and closing mechanism in the same electronic balance.

FIG. 4 illustrates a configuration example of the door opening and closing mechanism 12, and is a block diagram of the same configuration example. The door opening and closing mechanism 12 is provided for each of the left door 33 and the right door 34, and is independently controlled by the door opening and closing control unit 152. Hereinafter, description will be given with use of the right door 34.

For the right door 34, the door opening and closing mechanism 12 includes a first pressurization pump 121A, a second pressurization pump 121B, a first pressure sensor 122A, a second pressure sensor 122B, a first one-way solenoid valve 123A, a second one-way solenoid valve 123B, and an air cylinder 124. The first pressurization pump 121A and the second pressurization pump 121B are air pumps. Outlet sides of the first one-way solenoid valve 123A and the second one-way solenoid valve 123B are opened to the atmosphere, and by opening and closing the valves, air flowing and stoppage are controlled. The first pressure sensor 122A monitors a pressure of air discharged from the first pressurization pump 121A, and the second pressure sensor 122B monitors a pressure of air discharged from the second pressurization pump 121B. The first pressure sensor 122A and the second pressure sensor 122B are respectively connected to the air cylinder 124, and monitor a pressure of air inside the air cylinder 124. The air cylinder 124 is housed in an upper end portion of the right door 34 together with a piston rod 125 (FIG. 2). Other components are housed in the back case 32. Moreover, to the rear side of the air cylinder 124, the first pressurization pump 121A for advancing the right door 34 is connected, and to the front side of the air cylinder 124, the second pressurization pump 121B for retreating the right door 34 is connected.

The door opening and closing mechanism 12 is controlled by the door opening and closing control unit 152 of the control unit 15. When opening the right door 34 (when moving the door rearward), the door opening and closing control unit 152 does not activate the first pressurization pump 121A but opens the first one-way solenoid valve 123A and closes the second one-way solenoid valve 123B to pressurize the second pressurization pump 121B, so as to retreat the right door 34 by air pressure of the second pressurization pump 121B. On the other hand, when closing the right door 34 (when moving the door forward), the door opening and closing control unit 152 does not activate the second pressurization pump 121B but opens the second one-way solenoid valve 123B and closes the first one-way solenoid valve 123A to pressurize the first pressurization pump 121A, so as to advance the right door 34 by air pressure of the first pressurization pump 121A. Each time the right door 34 is fully opened or fully closed, the pressure sensor 122B, 122A detects a sudden pressure increase, so that the door opening and closing control unit 152 stops the pressurization, opens the valves to release the air to the atmosphere, so as to stop the movement of the right door 34.

Concerning the weight applying and removing mechanism 14, details of the configuration illustrated in FIG. 3 are described in Japanese Patent No. 4851882 disclosed as a patent literature. However, the weight applying and removing mechanism 14 may be configured, for example, to load and unload the built-in weight 13 to and from the load receiving portion connected to the weight sensor 11 by a motor and a cam mechanism. Concerning the door opening and closing mechanism 12, the configuration illustrated in FIG. 4 is described in detail in International Application No. PCT/JP 2020/011748. However, the door opening and closing mechanism 12 may be configured, for example, to move the door by a motor and a rack-and-pinion or a feed screw.

(Weighing Performance Confirmation Flow)

Figure 5:
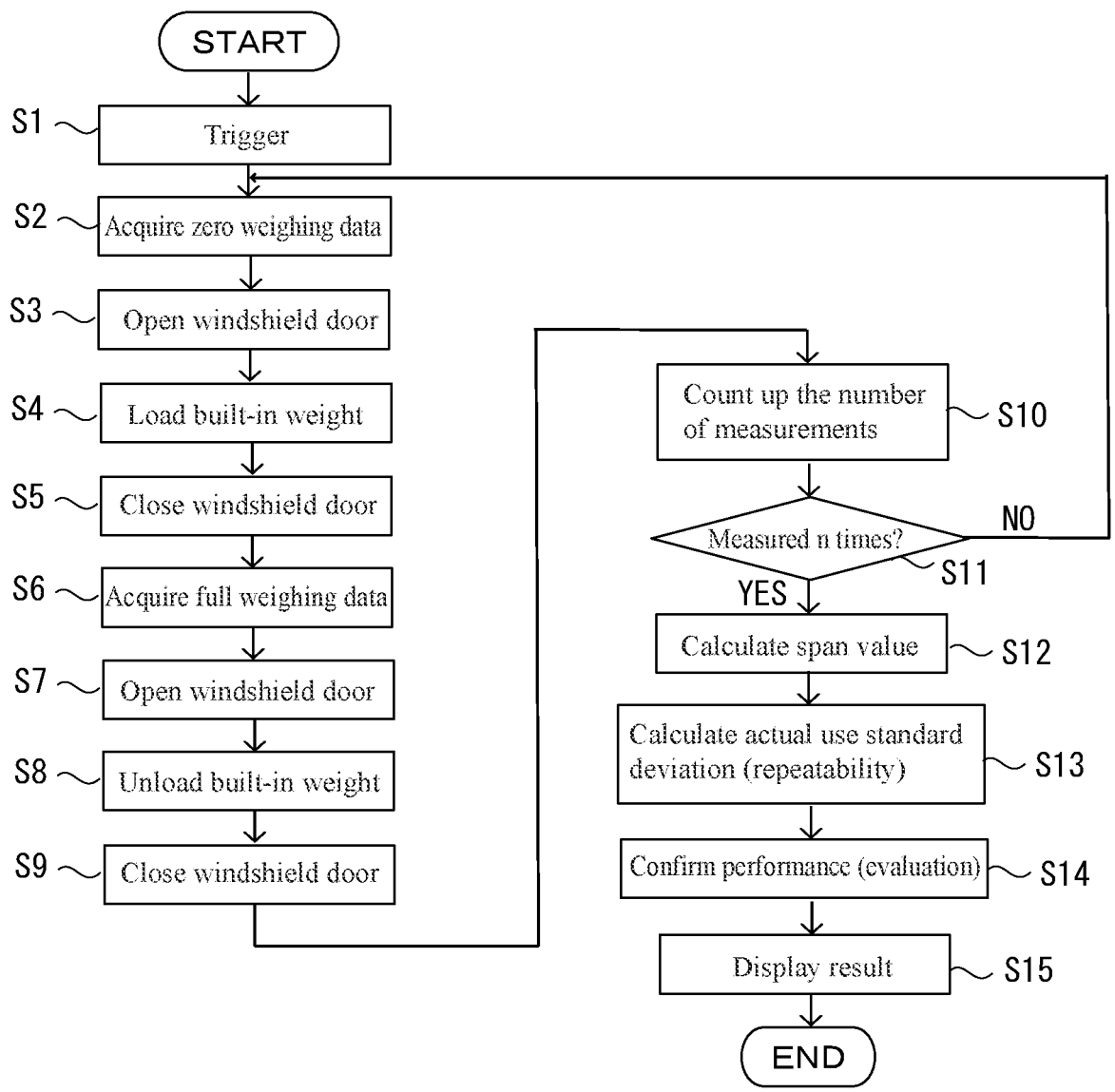
FIG. 5 is a flowchart of weighing performance confirmation according to an embodiment of the present invention.

Next, a weighing performance confirmation method using the balance 1 described above will be described. FIG. 5 is a flowchart of weighing performance confirmation according to an embodiment of the present invention.

First, in Step S1, for example, when a user opens a weighing performance confirmation menu from the operation unit 5 and selects START, this triggers weighing performance confirmation to start. Alternatively, weighing performance confirmation may be configured to be automatically started before the start of weighing, for example, when a user operates the door opening and closing sensor 51 to open the door.

As the processing shifts to Step S2, the weighing unit 151 functions, and after an acquisition time elapses, acquires weighing data in a state where neither the built-in weight 13 nor a to-be-weighed object is applied to the weight sensor 11 (hereinafter, referred to as "zero weighing data").

Next, the processing shifts to Step S3, and the door opening and closing control unit 152 functions and controls the door opening and closing mechanism 12 to open either the left or right door (which is to be set by a user. Hereinafter, description will be made with use of the right door 34). At this time, the door opening and closing control unit 152 fully opens the right door 34 (the position indicated by the dashed lines in FIG. 2). Due to opening of the right door 34, the environment in the weighing chamber is influenced by an environment outside the weighing chamber.

Next, the processing shifts to Step S4, and the weight applying and removing control unit 153 functions and controls the weight applying and removing mechanism 14 to load the built-in weight 13 on the load receiving portion 143.

Next, the processing shifts to Step S5, and the door opening and closing control unit 152 controls the door opening and closing mechanism 12 to close the right door 34 (the position indicated by the solid lines in FIG. 2).

Next, the processing shifts to Step S6, and after the acquisition time elapses, the weighing unit 151 acquires weighing data of the built-in weight 13 (hereinafter, referred to as "full weighing data").

Next, the processing shifts to Step S7, and the door opening and closing control unit 152 controls the door opening and closing mechanism 12 to open (fully open) the right door 34. Due to opening of the right door 34, the environment in the weighing chamber is influenced by an environment outside the weighing chamber again.

Next, the processing shifts to Step S8, and the weight applying and removing control unit 153 controls the weight applying and removing mechanism 14 to unload the built-in weight 13 from the load receiving portion 143.

Next, the processing shifts to Step S9, and the door opening and closing control unit 152 controls the door opening and closing mechanism 12 to close the right door 34.

Next, the processing shifts to Step S10, and the weighing performance confirming unit 154 functions and counts up the number of measurements of the built-in weight 13.

Next, the processing shifts to Step S11, and the weighing performance confirming unit 154 determines whether the number of measurements of the built-in weight 13 has reached the number of times (n times) set in advance. When the set number of times is not reached (No), the processing returns to Step S2. When the set number of times is reached (Yes), the processing shifts to Step S12. n is preferably 5 to 10.

As the processing shifts to Step S12, the weighing performance confirming unit 154 calculates a span value (difference between full weighing data and zero weighing data) of each measurement.

Next, the processing shifts to Step S13, and the weighing performance confirming unit 154 calculates a standard deviation (repeatability) of the span value. Here, the standard deviation obtained in this Step S13 is a standard deviation (repeatability) obtained through procedures that are performed at the time of actual weighing of a to-be-weighed object, which was measured with opening and closing of the door at the time of loading and unloading of the built-in weight 13 as in Steps S2 to S9. Hereinafter, the standard deviation obtained in this Step S13 is referred to as an actual use standard deviation SDreal (standard deviation of real).

Next, the processing shifts to Step S14, and the weighing performance confirming unit 154 confirms the weighing performance of the balance 1 by using the actual use standard deviation SDreal. For confirmation of the weighing performance, the actual use standard deviation SDreal is compared with the nominal repeatability specified in the catalog of the balance 1 (hereinafter, referred to as a specification standard deviation SDspec), and whether the actual use standard deviation SDreal is larger than the specification standard deviation SDspec is confirmed. When SDreal is larger than SDspec, there is a possibility that the repeatability expected from the catalog cannot be obtained in actual weighing as well.

Next, the processing shifts to Step S15, and the weighing performance confirming unit 154 displays a result of the weighing performance confirmation in Step S14 on the display unit 6. As a result of the weighing performance confirmation, at least numerical values of the actual use standard deviation SDreal and the specification standard deviation SDspec are displayed on the display unit 6.

When the actual use standard deviation SDreal is larger than the specification standard deviation SDspec (which is "when the actual use standard deviation is worse than a reference" in the claims), the surrounding environment judging unit 154 preferably displays a comment for notifying a user that the weighing performance of the balance 1 has been lowered by door opening and closing, for example, "Performance may be influenced by wind" along with the numerical values. However, the "reference" for determining a case "the actual use standard deviation is worse than a reference" is not limited only to the specification standard deviation SDspec, and an average deviation and a drift amount can also be employed.

(Weighing Performance Evaluation)

In Step S14, it is preferable that along with confirmation of the weighing performance of the balance 1, the weighing performance confirming unit 154 also performs evaluation of the weighing performance by setting an evaluation threshold in consideration of an internal design specific to the balance 1. Specific examples of weighing performance evaluation are shown below. However, the following are mere examples, and the values of evaluation thresholds and corresponding ranks shall be designed by comprehensively considering the internal design specific to the balance (including not only the minimum display and the weighing capacity, but also, for example, the type of the weight sensor of the balance, the internal structure and airtightness of the main body case, etc.). Further, in the examples described below, the display count of 1d used for setting of evaluation thresholds is used to convert the unit from 1 g (gram) into a smaller unit, and setting may be made with the units of 1 g (gram) used without change, and this does not preclude using any other units.

Example 1

(1) As an example, an evaluation threshold is set by using a display count of 1d of the balance (the display count of the balance means the smallest digit of a weighed value displayed on the display unit, and in a balance with minimum display of 1 μg, 1d=0.000001 g, and in a balance with minimum display of 0.1 mg, 1d is 0.0001 g).

(2) Assume an internal design specific to the balance 1 that the minimum display is 1 μg, in further consideration of a weighing capacity of the balance 1, an evaluation threshold is set. For example, when the weighing capacity of the balance 1 is 20 g, an evaluation threshold for rank "A" is set to 2d, and when the weighing capacity of the balance 1 is 5 g, an evaluation threshold for rank "A" is set to a more stringent value of 1d.

(3) In a case where evaluation thresholds of the balance 1 are set as follows:
Evaluation A: SDreal—SDspec is 1d or less
Evaluation B: SDreal—SDspec is more than 1d and not more than 3d
Evaluation C: SDreal—SDspec is more than 3d, and when a specification standard deviation SDspec of the balance 1 is =1.0 μg and where an actual use standard deviation SDreal=3.0 μg is obtained by the weighing performance confirmation, $$3.0 \text{ μg} - 1.0 \text{ μg} = 2.0 \text{ μg} = 2d$$

is obtained, and therefore, evaluation "B" is judged.

Example 2

On the assumption that the specification standard deviation SDspec is the performance of the balance 1, the actual use standard deviation SDreal obtained accompanied by door opening and closing can be considered to be a synthesis of the specification standard deviation SDspec and a standard deviation SDoc (open-close) corresponding to an influence of door opening and closing. From additivity of variance, the square of SDreal can be expressed as a sum of the square of SDspec and the square of SDoc. Therefore, the standard deviation SDoc corresponding to the influence of door opening and closing can be obtained by Numerical Formula 1:

$$SDoc = \sqrt{(SDreal)^2 - (SDspec)^2} \quad \text{[Numerical Formula 1]}$$

For this standard deviation SDoc corresponding to the influence of door opening and closing, evaluation thresholds are set in consideration of an internal design specific to the balance, and the weighing performance of the balance 1 is evaluated.

(1) As an example, evaluation thresholds are set by using a display count of 1d of the balance.
(2) In consideration of the internal design specific to the balance 1, an evaluation threshold for rank "A" is set to a more stringent value of 0.5d.
(3) In a case where evaluation thresholds of the balance 1 are set as follows:
Evaluation A: SDoc is 0.5d or less
Evaluation B: SDoc is more than 0.5d and not more than 1.0d
Evaluation C: SDoc is more than 1.0d, and
when the standard deviation SDoc=1.92 μg is obtained in the balance 1, evaluation "C" is judged.

Figure 6:
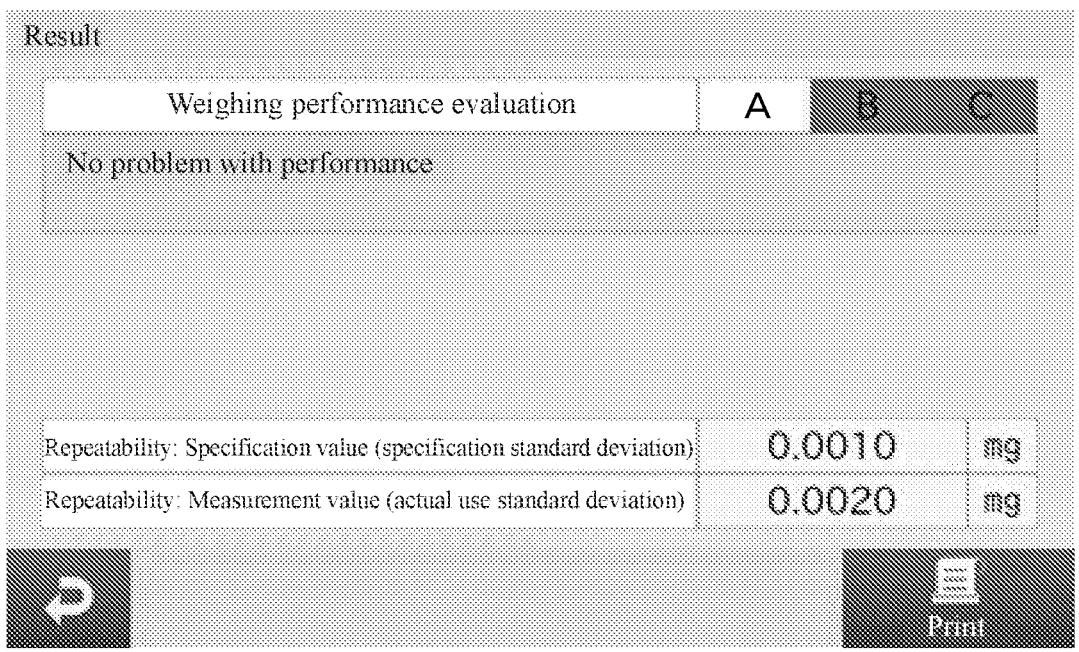
FIG. 6 illustrates a display example of an evaluation result in the same flow.

When evaluation is performed in Step S14, in Step S15, the weighing performance confirming unit 154 displays the numerical value of the actual use standard deviation SDreal, the evaluated level, and a comment corresponding to the level on the display unit 6. As an example, the display unit 6 displays "No problem with performance" when evaluation A is judged, "Performance has slightly deteriorated" when evaluation B is judged, and "Performance has deteriorated" when evaluation C is judged. FIG. 6 illustrates a display example of an evaluation result.

Note that it is also possible to output weighing performance confirmation and evaluation results from the balance 1 to an external device such as a printer or a personal computer by an RS232C cable, a USB, or BLE (Bluetooth low energy. Bluetooth is a registered trademark). FIG. 7 illustrates an output example of an evaluation result to a printer.

Effect

It is known that as the accuracy of the electronic balance becomes higher, and further, as a windshield is provided, air flowing in the weighing chamber has greater influence on weighing when a door is opened. Therefore, it is highly possible that the repeatability measured in a state where the windshield is closed for confirmation of the weighing performance is different from the repeatability exhibited at the time of weighing accompanied by door opening and closing. In actuality, there were many reports that the weighing performance guaranteed for the balance could not be obtained although the repeatability was confirmed before weighing.

In contrast, according to the balance 1 and the method for confirming the weighing performance of the balance 1 according to the present embodiment, the repeatability (actual use standard deviation SDreal) is measured not in a state where the windshield 3 is closed but under the same conditions as those of actual weighing of a to-be-weighed object by a user, that is, under conditions where the door of the windshield 3 is opened, the built-in weight 13 is loaded, the door is closed, weighing data is measured, the door is opened, and the built-in weight 13 is unloaded. Therefore, to what extent the repeatability (weighing performance) is exhibited under conditions of weighing (actual use conditions) can be known.

As the repeatability (actual use standard deviation SDreal) under conditions of actual use can be confirmed, a user himself/herself can judge on the spot whether weighing can be continued. Further, as the weighing performance is represented in the form of evaluation according to the value of the actual use standard deviation SDreal, the user can more easily judge whether weighing can be continued.

Next, preferred modifications of the balance 1 according to the embodiment will be shown. The same configuration as in the embodiment is provided with the same reference sign, and description thereof will be omitted.

(Modification 1)

Figure 8:
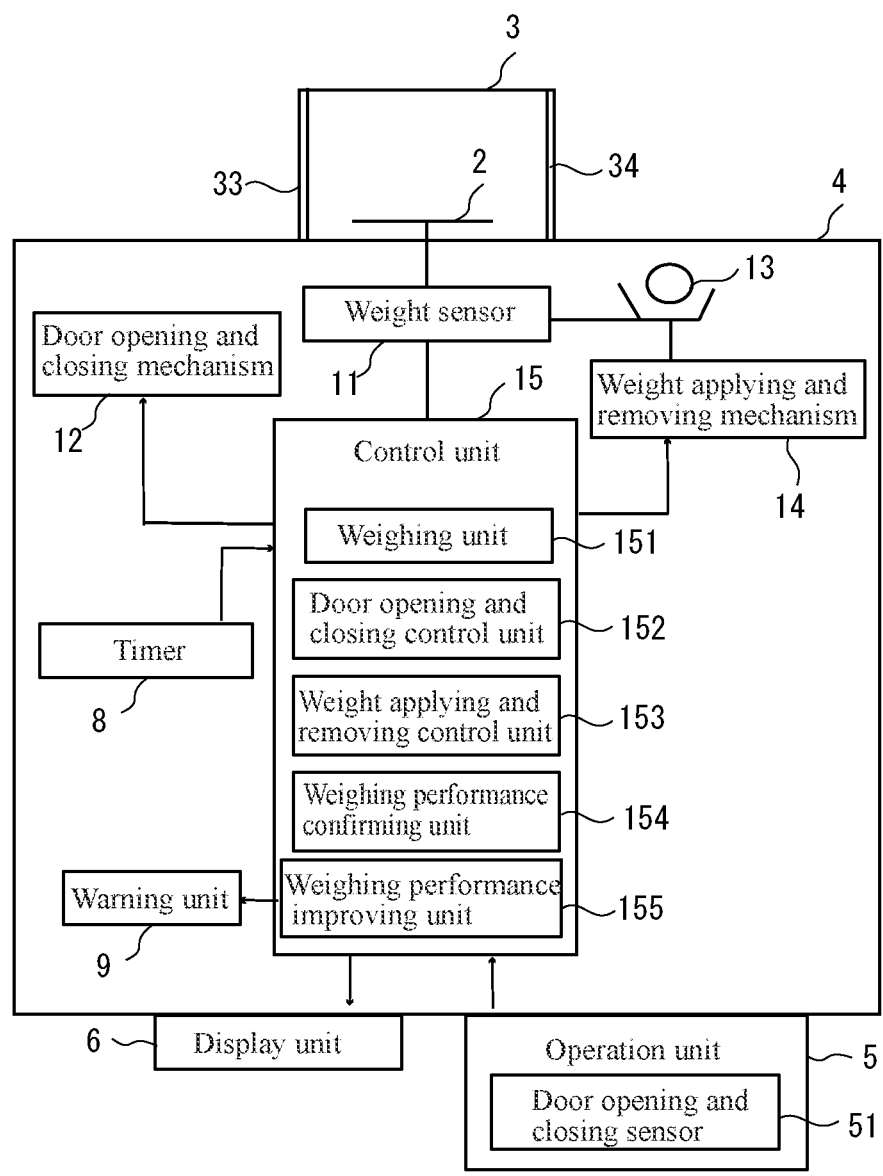
FIG. 8 is a component block diagram of an electronic balance according to Modification 1 of the embodiment of the present invention.

FIG. 8 is a component block diagram of an electronic balance 1A (hereinafter, simply referred to as a balance 1A) according to Modification 1 of the embodiment of the present invention. The balance 1A further includes a warning unit 9 and a weighing performance improving unit 155 in addition to the configuration of the embodiment (FIG. 1). The warning unit 9 is a buzzer, a lighting lamp, or the like. The weighing performance improving unit 155 consists of an electronic circuit in the control unit 15.

The balance 1A performs the weighing performance confirmation flow (FIG. 5) in the same manner as in the embodiment. When an actual use standard deviation SDreal is larger than a specification standard deviation SDspec (which is "when the actual use standard deviation is worse than a reference" in the claims), the weighing improving unit 155 functions and applies the following modification to weighing after the weighing performance confirmation. As the "reference" for determining whether "the actual use standard deviation is worse than a reference," an average deviation or a drift amount may be employed as well as the specification standard deviation SDspec.

The weighing performance improving unit 155 measures an elapsed time from the end of an operation of opening the right door 34 by using the timer 8 when a user starts weighing and the door (description will be made with use of the right door 34) is automatically opened through the door opening and closing sensor 51. As it is detected that a default setting opening time (the "default setting opening time" is stored in advance in the memory of the control unit 15) has passed, the weighing performance improving unit 155 produces a buzzer sound or light from the warning unit 8 to warn the user that the door is open for an excessively long time.

When the actual use standard deviation SDreal is worse than the reference, this state is a state where the environment in the weighing chamber is under the influence of an adverse environment outside the weighing chamber. Therefore, performing weighing while leaving the door open as little as possible leads to an improvement in weighing performance. In Modification 1, an improvement in weighing performance is sought by issuing a warning to urge the user to close the door as soon as possible when the period of time the user leaves the door open is judged to be long.

(Modification 2)

Figure 9:
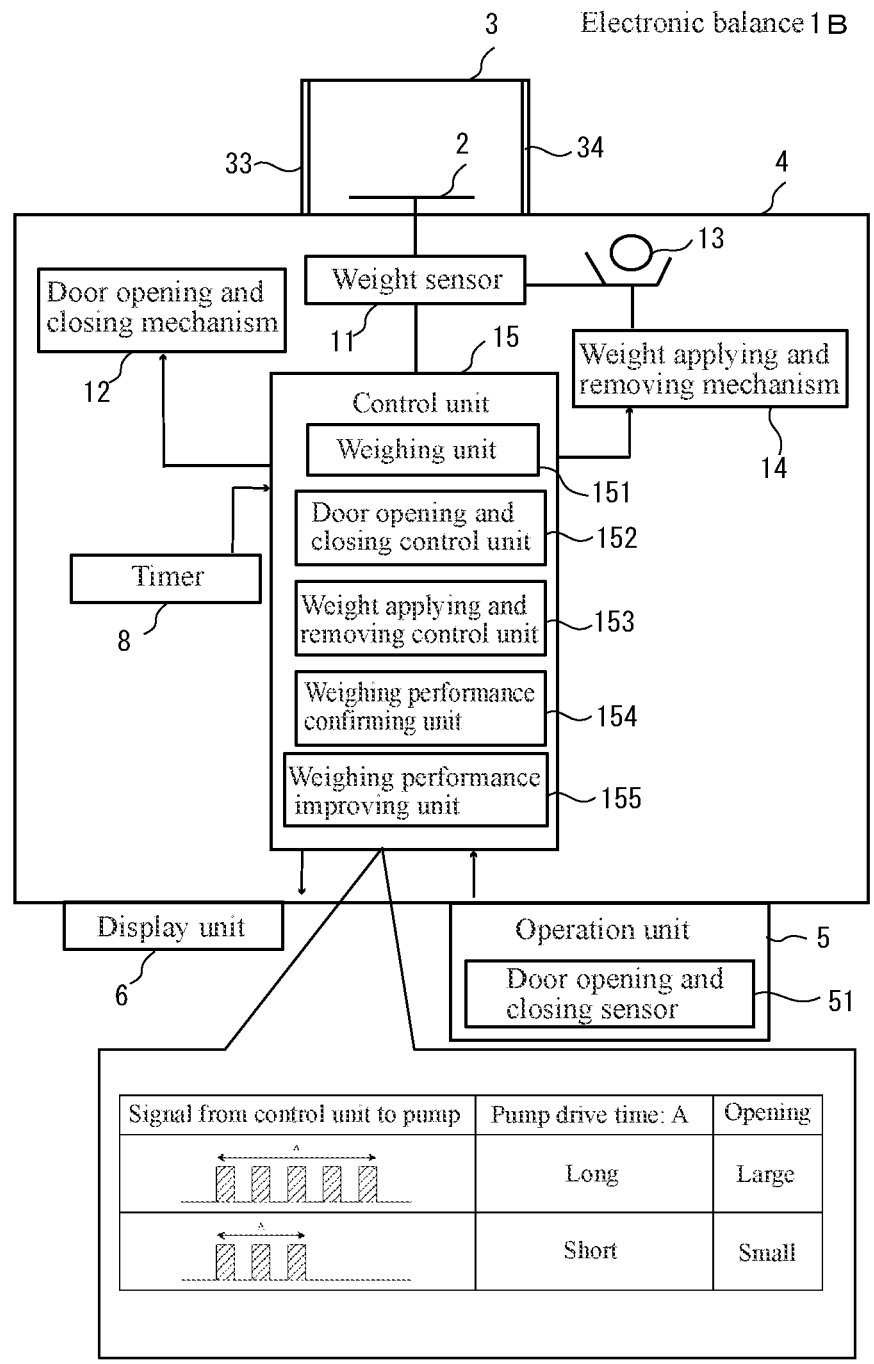
FIG. 9 is a component block diagram of an electronic balance according to Modification 2 of the embodiment of the present invention.

FIG. 9 is a component block diagram of an electronic balance 1B (hereinafter, simply referred to as a balance 1B) according to Modification 2 of the embodiment of the present invention. The balance 1B further includes a weighing performance improving unit 155 in addition to the configuration of the embodiment (FIG. 5).

The balance 1B performs the weighing performance confirmation flow (FIG. 5) in the same manner as in the embodiment. When an actual use standard deviation SDreal is larger than a specification standard deviation SDspec (which is "when the actual use standard deviation is worse than a reference" in the claims), the weighing improving unit 155 functions and applies the following modification to weighing after the weighing performance confirmation.

When the user starts weighing and the door (description will be made with use of the right door 34) is automatically opened through the door opening and closing sensor 51, the weighing performance improving unit 155 does not fully open the right door 34, but performs a control so that an opening width becomes smaller than a default setting opening width (an opening width when the door is fully open. Refer to the reference sign DB indicated by the alternate long and short dash line in FIG. 2). Specifically, the weighing performance improving unit 155 reduces the opening width of the right door 34 by making the door opening and closing mechanism 12 in FIG. 4 have a shorter pump drive time A of the second pressurization pump 121B when opening the right door 34. Alternatively, it is also possible that a plurality of reflective photosensors are provided in the back case 32 of the windshield 3, and the weighing performance improving unit 155 controls the opening width by detecting passage of the right door 34.

When the actual use standard deviation SDreal is worse than the reference, this state is a state where the environment in the weighing chamber is under the influence of an adverse environment outside the weighing chamber. Therefore, performing weighing while leaving the door open as little as possible leads to an improvement in weighing performance. In Modification 2, an improvement in weighing performance is sought by preventing air from flowing into the weighing chamber from the outside of the weighing chamber as much as possible by narrowing the door opening width.

(Modification 3)

Figure 10:
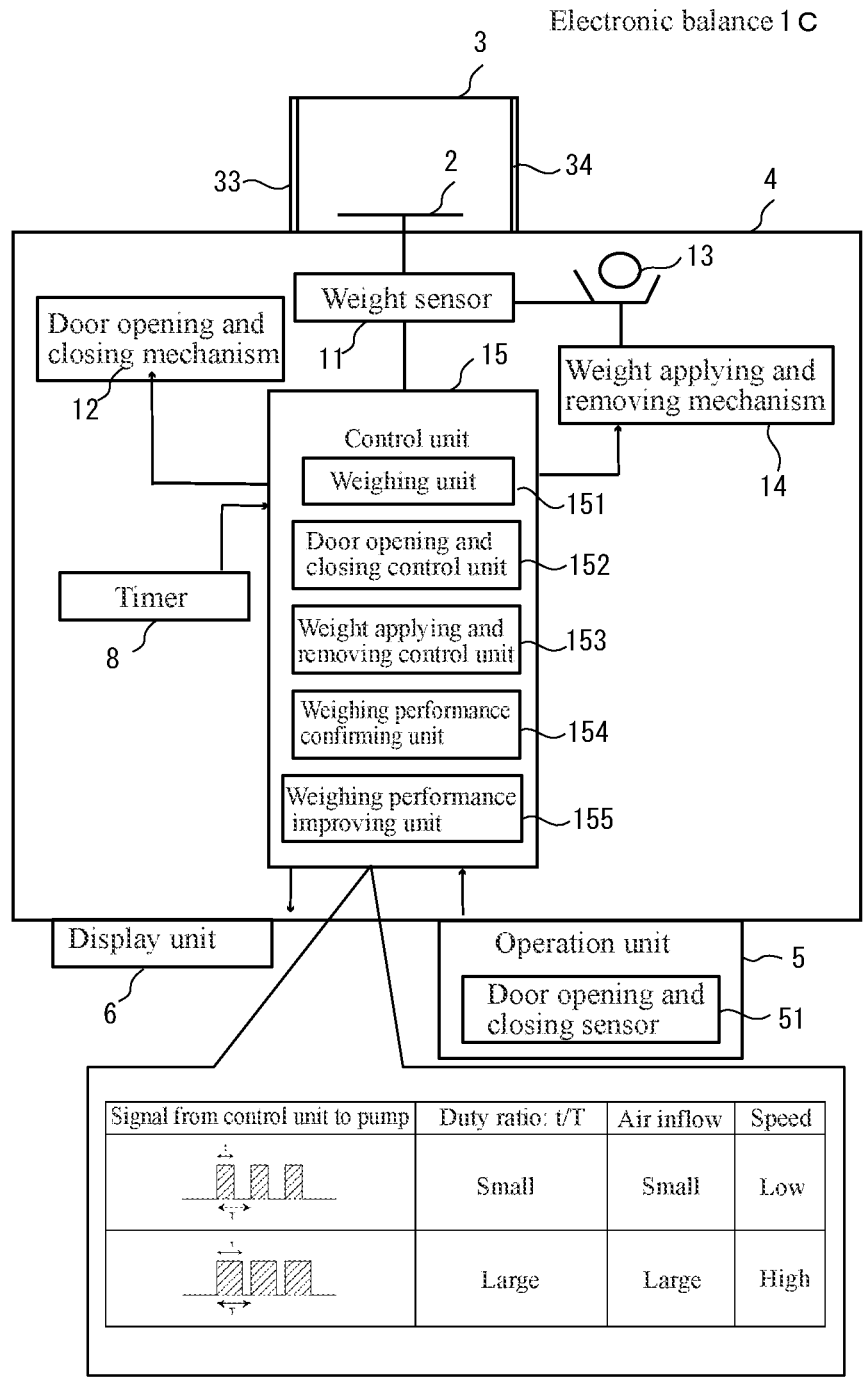
FIG. 10 is a component block diagram of an electronic balance according to Modification 3 of the embodiment of the present invention.

FIG. 10 is a component block diagram of an electronic balance 1C (hereinafter, simply referred to as a balance 1C) according to Modification 3 of the embodiment of the present invention. The balance 1C further includes a weighing performance improving unit 155 in addition to the configuration of the embodiment (FIG. 1).

The balance 1C performs the weighing performance confirmation flow (FIG. 5) in the same manner as in the embodiment. When an actual use standard deviation SDreal is larger than a specification standard deviation SDspec (which is "when the actual use standard deviation is worse than a reference" in the claims), the weighing improving unit 155 functions and applies the following modification to weighing after the weighing performance confirmation.

When the user starts weighing and the door (description will be made with use of the right door 34) is automatically opened through the door opening and closing sensor 51, the weighing performance improving unit 155 increases a door opening speed of the right door 34 to be higher than a default setting door opening and closing speed (the "default setting door opening and closing speed" is stored in advance in the memory of the control unit 15). Specifically, the weighing performance improving unit 155 increases the door opening speed of the right door 34 by making the door opening and closing mechanism 12 in FIG. 4 to have a duty ratio t/T (T is a control period, and t is a drive time) of a pump drive signal for the second pressurization pump 121B when opening the right door 34 that is larger than default setting. Similarly, as the user completes placing a to-be-weighed object on the weighing pan 2 and the right door 34 is automatically closed through the door opening and closing sensor 51, the weighing performance improving unit 155 increases a door closing speed of the right door 34 to be higher than the default setting opening and closing speed.

When the actual use standard deviation SDreal is worse than the reference, this state is a state where the environment in the weighing chamber is under the influence of an adverse environment outside the weighing chamber. Therefore, performing weighing while leaving the door open as little as possible leads to an improvement in weighing performance. In Modification 3, an improvement in weighing performance is sought by preventing air from flowing into the weighing chamber from the outside of the weighing chamber as much as possible by increasing the door opening and closing speed.

(Modification 4)

Figure 11:
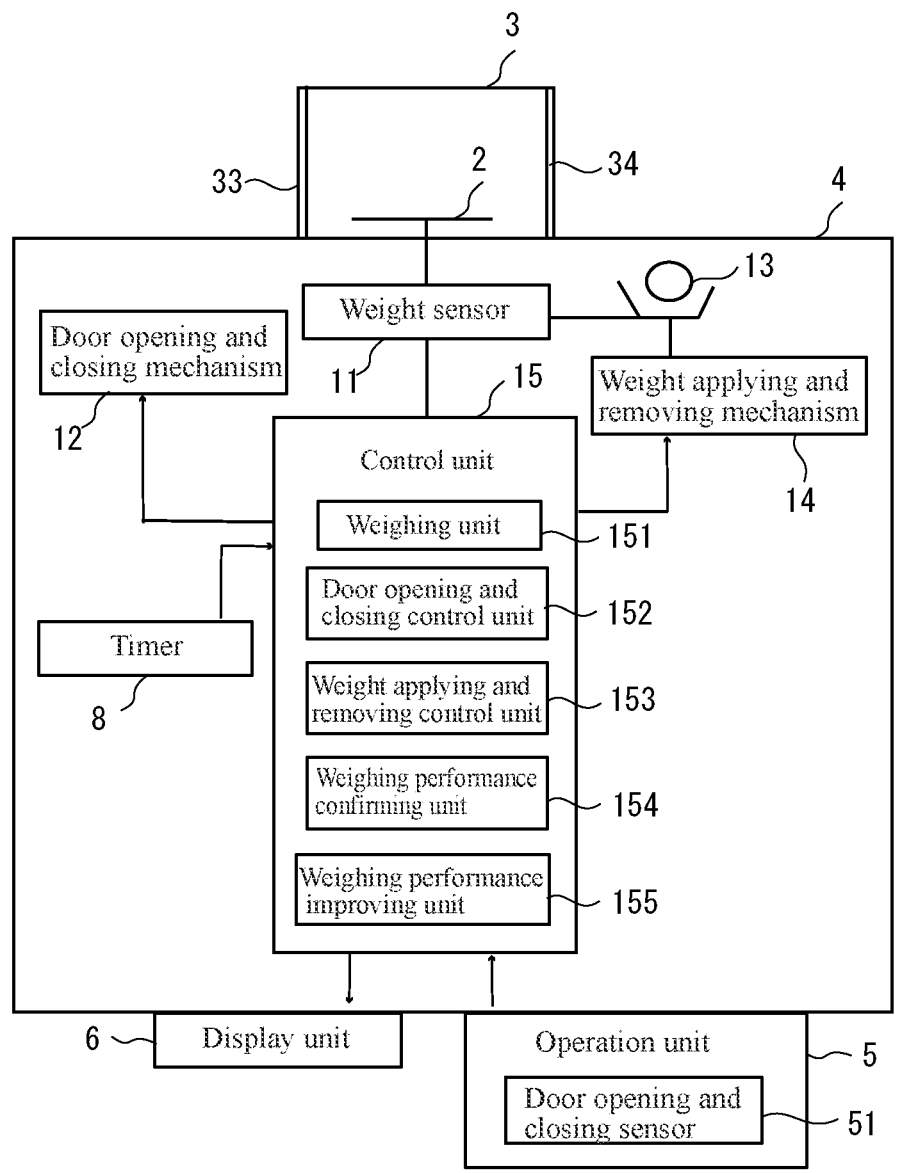
FIG. 11 is a component block diagram of an electronic balance according to Modification 4 of the embodiment of the present invention.

FIG. 11 is a component block diagram of an electronic balance 1D (hereinafter, simply referred to as a balance 1D) according to Modification 4 of the embodiment of the present invention. The balance 1C further includes a weighing performance improving unit 155 in addition to the configuration of the embodiment (FIG. 1).

The balance 1D performs the weighing performance confirmation flow (FIG. 5) in the same manner as in the embodiment. When an actual use standard deviation SDreal is larger than a specification standard deviation SDspec (which is "when the actual use standard deviation is worse than a reference" in the claims), the weighing improving unit 155 functions and applies the following modification to weighing after the weighing performance confirmation.

When the user starts weighing and places a to-be-weighed object on the weighing pan 2, the weighing performance improving unit 155 lengthens the "acquisition time" for which stabilization of a signal of the to-be-weighed object waits to be longer than a default setting acquisition time (set and stored in advance in the memory of the control unit 15), and acquires weighing data.

When the actual use standard deviation SDreal is worse than the reference, this state is a state where the environment in the weighing chamber is under the influence of an adverse environment outside the weighing chamber. Therefore, in the default setting acquisition time, the signal variation may occur and multiple signals leading to an error may be included. In Modification 4, an improvement in weighing performance is sought by calculating a weighed value after the influence from the outside of the weighing chamber is temporally mitigated by lengthening the weighing data acquisition time.

(Modification 5)

Figure 12:
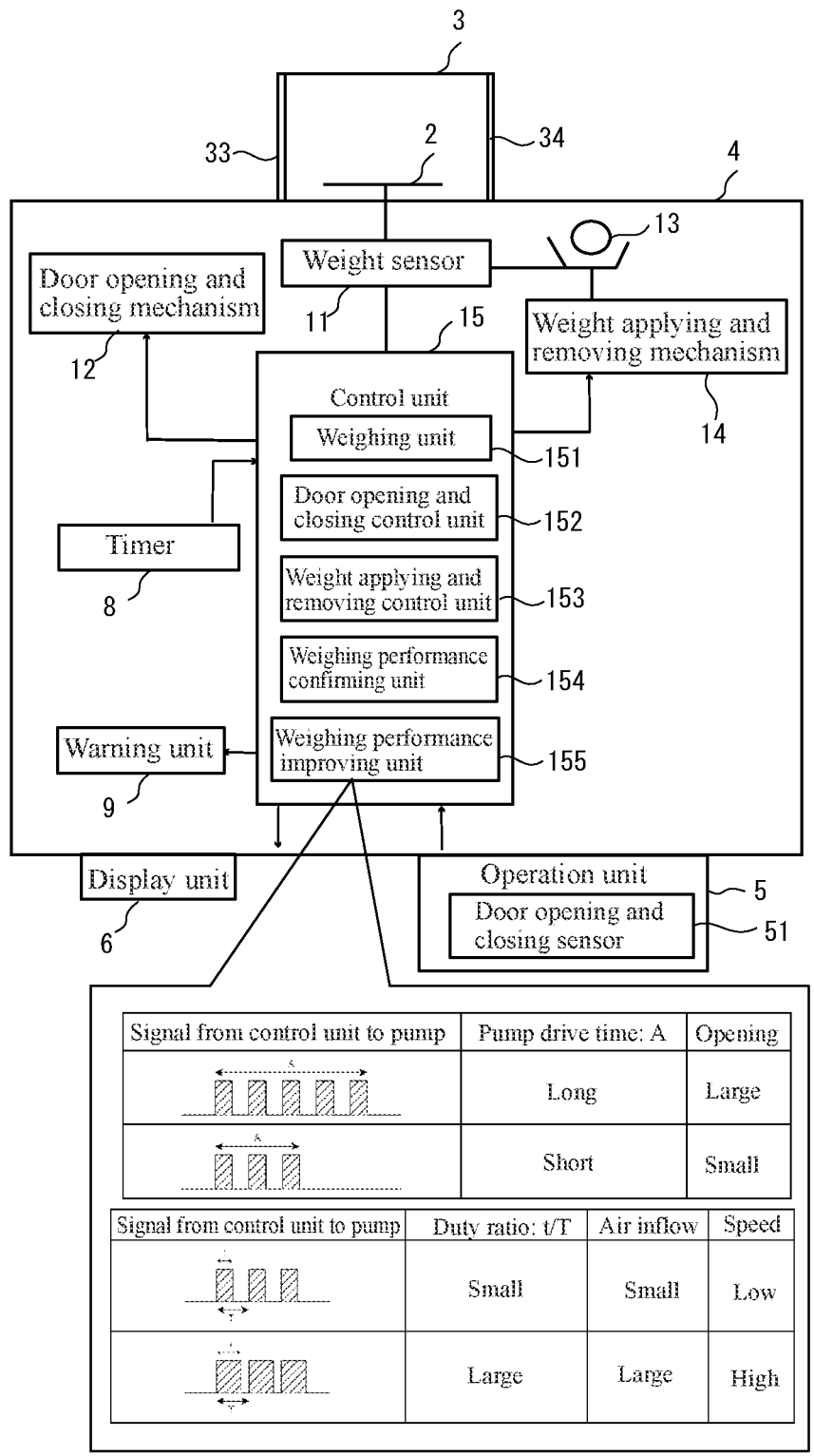
FIG. 12 is a component block diagram of an electronic balance according to Modification 5 of the embodiment of the present invention.

A weighing performance improving unit 155 of an electronic balance 1E (hereinafter, simply referred to as a balance 1E) according to Modification 5 of the embodiment of the present invention includes a combination of at least two of the weighing performance improving controls described in Modifications 1 to 4. For example, the balance 1E is configured to be able to perform all of the weighing performance improving controls described in Modifications 1 to 4. FIG. 12 is a component block diagram of the balance 1E in this case.

The weighing performance confirming unit 154 of the balance 1E evaluates the weighing performance and ranks the evaluation based on the weighing capacity or the display count of the minimum display of the balance 1E. According to the examples described in Description of Embodiments, the weighing performance confirming unit 154 ranks each evaluation as A, B, or C (the ranking goes down in this order).

The weighing performance improving unit 155 refers to the rank, and the lower the rank, the more the weighing performance improving unit combines the weighing performance improving controls described in Modifications 1 to 4. For example, the control of Modification 1 (warning the user that the door is open for an excessively long time) is performed when evaluation A (no problem with the performance) is judged, the control of Modification 2 (narrowing the door opening width) is performed in addition to Modification 1 when evaluation B (the performance has slightly deteriorated) is judged, and the controls of Modification 3 (increasing the door opening and closing speed) and Modification 4 (lengthening the acquisition time) are performed in addition to Modification 1 and Modification 2 when evaluation C (the performance has deteriorated) is judged.

In Modification 5, an improvement in weighing performance is sought by increasing the controls for improving the weighing performance as the actual use standard deviation SDreal becomes larger than the specification standard deviation SDspec.

Preferred embodiments and modifications of the present invention have been described above, and each embodiment and each modification can be combined based on knowledge skilled in the art, and such a combined embodiment is included in the scope of the present invention.

REFERENCE SIGNS LIST 1, 1A, 1B, 10, 1D Electronic balance
2 Weighing pan
3 Windshield
   33 Left door (door)
   34 Right door (door)
4 Balance main body
5 Operation unit
6 Display unit
8 Timer
9 Warning unit
11 Weight sensor
12 Door opening and closing mechanism
13 Built-in weight
14 Weight applying and removing mechanism
15 Control unit
151 Weighing unit
152 Door opening and closing control unit
153 Weight applying and removing control unit
154 Weighing performance confirming unit
155 Weighing performance improving unit

The invention claimed is:

1. An electronic balance comprising:
a weighing pan on which a to-be-weighed object is placed;
a windshield surrounding the weighing pan;
a door opening and closing mechanism configured to automatically open and close a door of the windshield;
a weight sensor to which a load applied to the weighing pan is transmitted;
a built-in weight to be loaded on and unloaded from the weight sensor;
a weight applying and removing mechanism for the built-in weight; and
a control unit configured to control the door opening and closing mechanism and the weight applying and removing mechanism, wherein
the control unit
measures a standard deviation of the built-in weight as an actual use standard deviation
accompanied by a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the door opening and closing mechanism.

2. The electronic balance according to claim 1, wherein when the actual use standard deviation is worse than a reference, the control unit notifies a user that the weighing performance of the balance has been lowered by opening and closing of the door.

3. The electronic balance according to claim 1, wherein the control unit ranks a difference value between the actual use standard deviation and a specification standard deviation, or a square root value of a difference between the square of the actual use standard deviation and the square of the specification standard deviation according to an evaluation threshold set in consideration of an internal design of the electronic balance, so as to evaluate the weighing performance of the balance.

4. The electronic balance according to claim 1, wherein when the actual use standard deviation is worse than a reference, the control unit measures an opening time during which the door is open when weighing the to-be-weighed object, and issues a warning when a default setting opening time passes.

5. An electronic balance, wherein the control unit ranks the actual use standard deviation, and the lower the rank, the more the control unit performs the control described in claim 4 in combination.

6. The electronic balance according to claim 1, wherein when the actual use standard deviation is worse than a reference, the control unit controls the door opening and closing mechanism to make smaller an opening width of the door when weighing the to-be-weighed object than a default setting opening width.

7. An electronic balance, wherein the control unit ranks the actual use standard deviation, and the lower the rank, the more the control unit performs the control described in claim 6 in combination.

8. The electronic balance according to claim 1, wherein when the actual use standard deviation is worse than a reference, the control unit controls the door opening and closing mechanism to make higher an opening and closing speed of the door when weighing the to-be-weighed object than a default setting opening and closing speed.

9. An electronic balance, wherein the control unit ranks the actual use standard deviation, and the lower the rank, the more the control unit performs the control described in claim 8 in combination.

10. The electronic balance according to claim 1, wherein when the actual use standard deviation is worse than a reference, the control unit controls the door opening and closing mechanism to make longer an acquisition time of weighing data of the to-be-weighed object when weighing the to-be-weighed object than a default setting acquisition time.

11. An electronic balance, wherein the control unit ranks the actual use standard deviation, and the lower the rank, the more the control unit performs the control described in claim 10 in combination.

12. A method for confirming the weighing performance of an electronic balance comprising a weighing pan on which a to-be-weighed object is placed, a windshield surrounding the weighing pan, a door opening and closing mechanism configured to automatically open and close a door of the windshield, a weight sensor to which a load applied to the weighing pan is transmitted, a built-in weight to be loaded on and unloaded from the weight sensor, a weight applying and removing mechanism for the built-in weight, and a control unit configured to control the door opening and closing mechanism and the weight applying and removing mechanism, comprising:

a step of measuring a standard deviation of the built-in weight as an actual use standard deviation by repeating in order:

a step of opening the door of the windshield by the door opening and closing mechanism;

a step of loading the built-in weight by the weight applying and removing mechanism;

a step of closing the door of the windshield by the door opening and closing mechanism;

a step of acquiring weighing data of the built-in weight;

a step of opening the door of the windshield by the door opening and closing mechanism;

a step of unloading the built-in weight by the weight applying and removing mechanism; and a step of closing the door of the windshield by the door opening and closing mechanism.

\* \* \* \* \*